Figure 1:
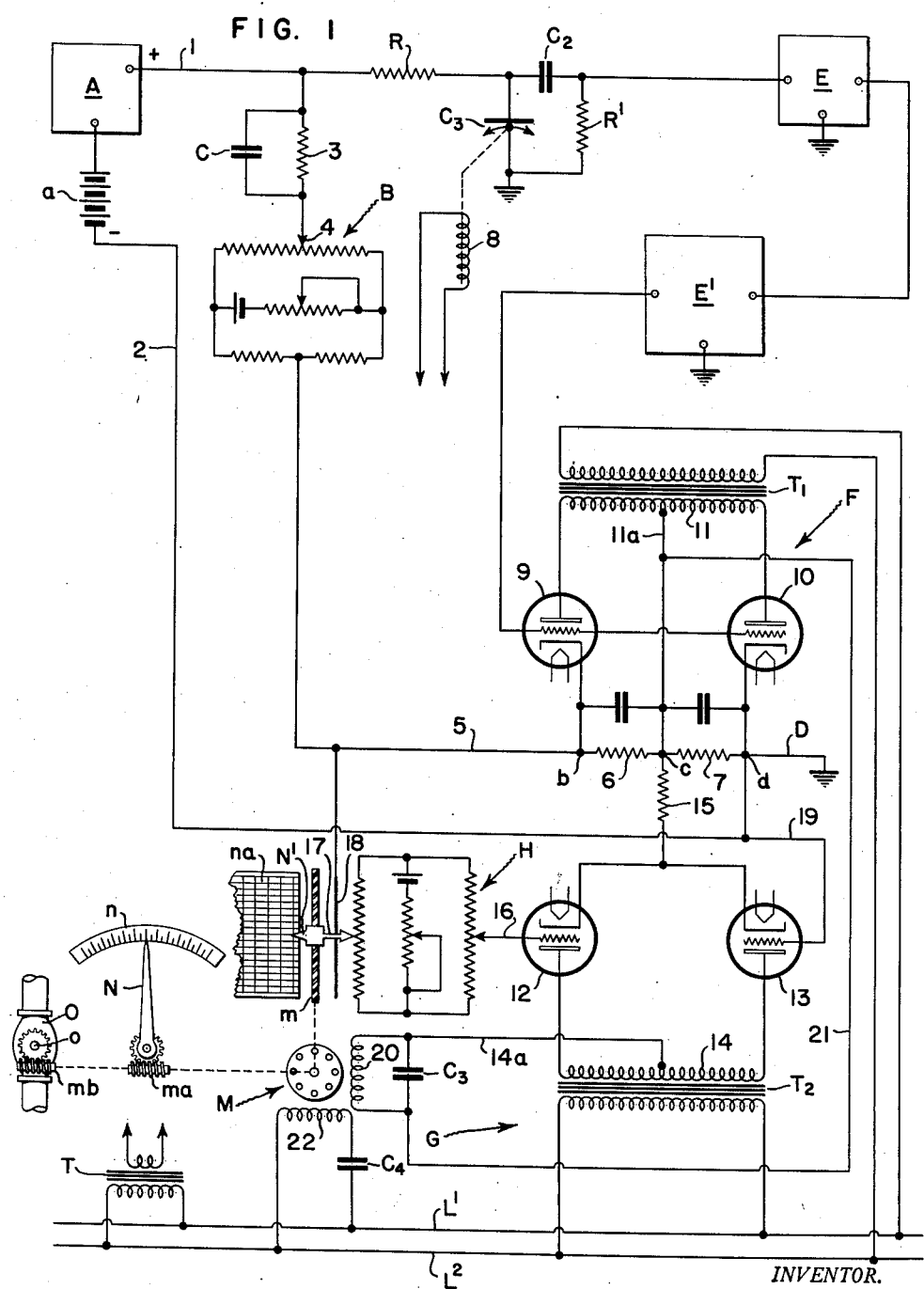

June 15, 1954 — J. C. MOUZON — 2,681,430
SELF-BALANCING MEASURING AND CONTROLLING APPARATUS
Filed Aug. 17, 1950 — 2 Sheets-Sheet 1

INVENTOR.
JAMES C. MOUZON
BY Arthur H. Swanson
ATTORNEY.

June 15, 1954     J. C. MOUZON     2,681,430
SELF-BALANCING MEASURING AND CONTROLLING APPARATUS
Filed Aug. 17, 1950     2 Sheets-Sheet 2

INVENTOR.
JAMES C. MOUZON
BY
ATTORNEY.

Patented June 15, 1954

2,681,430

UNITED STATES PATENT OFFICE 2,681,430

SELF-BALANCING MEASURING AND CONTROLLING APPARATUS

James C. Mouzon, Chevy Chase, Md., assignor to Minneapolis-Honeywell Regulator Company, Minneapolis, Minn., a corporation of Delaware Application August 17, 1950, Serial No. 179,929

5 Claims. (Cl. 318—28)

The general object of the present invention is to provide improved apparatus for producing measuring and control effects in response to variations in a minute unidirectional current or voltage. More specifically, the object of the invention is to provide improvements in apparatus of the general character of the electrometer disclosed and claimed in my prior application Serial No. 130,275, filed November 30, 1949, now Patent No. 2,659,848 of November 17, 1953.

That apparatus is adapted to measure the unidirectional current output of a high impedance source, such as an ionization chamber or a pH cell, having an output current which may be as small as $10^{-15}$ amperes, or smaller, and comprises means for converting the minute unidirectional output current into an alternating current signal and amplifying the latter. That amplified signal forms an electronic motor drive signal, and is employed to energize selectively a two phase reversible electric motor for operation in one direction on an increase, and in the opposite direction on a decrease, in the current output of the high impedance source. In said prior application, the reversible motor is employed to rebalance automatically a potentiometric measuring circuit when that circut is unbalanced by an increase or a decrease in said output current.

The apparatus disclosed and claimed herein includes a reversible electric motor which may be used for various purposes, and which is controlled by novel means not disclosed in my prior application.

A specific object of the present invention is to provide apparatus of the general character disclosed and claimed in said prior application in combination with a phase sensitive rectifier connected to the amplifier output circuit and operating to feed a degenerative, stabilizing signal back to the amplifier input circuit, and to combine, with said phase sensitive rectifier, novel means for controlling the reversible motor which permits the latter to be of a rugged character suitable for use in controlling its own operation, and for one or more other purposes dependent on variations in said output current, such as the adjustment of a control valve and the adjustment of a recording pen arm.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 2:
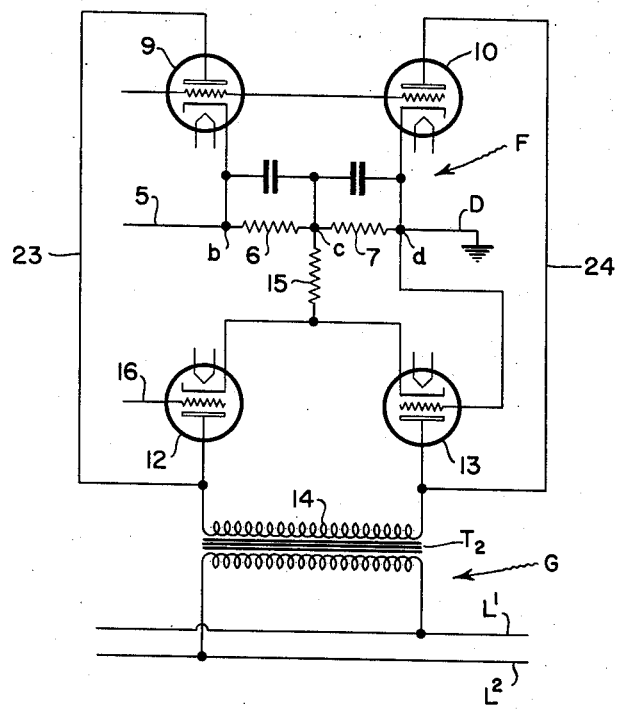

Of the drawings:

Fig. 1 is a circuit network diagram illustrating one embodiment of the invention; and Fig. 2 is a circuit diagram illustrating a modification of a portion of the apparatus shown in Fig. 1.

The apparatus diagrammatically shown in Fig. 1 includes an electrometer measuring circuit and amplifier means of the general type and form disclosed in my said prior application. While the electrometer apparatus shown is intended for, and is used in, measuring exceedingly small direct currents of the order of, or even smaller than, $10^{-15}$ amperes, said apparatus is not restricted to use in measuring such small electrical quantities. The circuit network shown in Fig. 1 comprises an electronic motor drive section G arranged to selectively energize a reversible electric motor M for operation to adjust a potentiometer H included in a grid circuit of the motor drive section, and also serving to adjust a recording pen arm N', an indicator N, and a control valve O.

In Fig. 1, A represents an ionization chamber energized by a source of direct current $a$, and having positive and negative output terminals 1 and 2, respectively. A unidirectional current developed in the chamber A may flow from the terminal 1 to the terminal 2 through a flow path comprising a parallel connected resistor 3 and condenser C, a slider contact 4 connecting the resistor 3 and condenser C to an adjustable potentiometer B, and a conductor 5 through which the potentiometer B connects the contact 4 through series connected resistors 6 and 7 to a ground connection D to which the terminal 2 is directly connected. As shown, the conductor 5 is connected to one end of the resistor 6 at the point $b$. The second end of the resistor 6 is connected to one end of the resistor 7 at the point $c$. The second end of the resistor 7 is connected to the ground connection D at the point $d$. Most of the voltage drop between the terminal 1 and ground occurs in the resistor 3 which may have a resistance of the order of 100,000 megohms. The voltage drops across the potentiometer B and in the resistors 6 and 7 are at all times very small in magnitude in comparison with the voltage drop across the resistor 3. The potentiometer B is provided for use in making zero adjustments, ordinarily made manually.

The terminal 1 is connected by a resistor R and a condenser $C_2$ to the input terminal of a preamplifier E. A vibrating condenser $C_3$ has one plate connected to the connected terminals of the resistor R and condenser $C_2$, and has its second plate connected to ground. The last mentioned plate has a predetermined frequency of vibration, ordinarily 60 cycles per second, which is the same as the voltage frequency of associated alternating current supply conductors $L'$ and $L^2$, across which is connected through a transformer T the winding 8 of a polarized vibrator which vibrates said second plate. The terminal of the condenser $C_2$ which is connected to the preamplifier E is also connected to ground through a resistor $R'$. The voltage output of the preamplifier E is further amplified by the amplifier $E'$.

The output voltage of the amplifier $E'$ is impressed on the control grids of electronic triode valves 9 and 10, each of which has its control grid connected to the output terminal of said amplifier. As shown, the anodes of the triodes 9 and 10 are connected to opposite ends of the secondary winding 11 of a transformer $T_1$. The latter has its primary winding connected across the alternating current supply conductors $L'$ and $L^2$. The cathode of the triode 9 is connected at the point b to the connected ends of the conductor 5 and resistor 6. The cathode of the triode 10 is connected at the point d to the ground connection D and to the end of the resistor 7 connected thereto. A center tap conductor 11a connects the midpoint of the winding 11 to the point c at which the resistors 6 and 7 are connected to one another. The resistors 6 and 6 thus form cathode resistors for the triodes 9 and 10, respectively, each of said resistors being connected in the cathode circuit of the corresponding triode, along with the half of the winding 11 connected to the anode of the valve, and with the center tap conductor 11a, which is included in the cathode circuits of both valves.

As those skilled in the art will recognize, the triodes 9 and 10 with their anodes and cathodes connected as described, and with both of their control grids connected to the output terminal of the amplifier $E'$, constitute a phase sensitive rectifier F. The high impedance resistor 3, with its shunt condenser, potentiometer B, conductor 5, cathode resistors 6 and 7, and ground connection D, form a feedback circuit through which the phase sensitive rectifier F feeds a degenerative stabilizing, or balancing, signal back to the input circuit of the preamplifier E, and thus contributes to stabilization of the sensitive circuit including the ionization chamber terminal 1, and the associated conversion and amplifying apparatus. To eliminate ripple in the feedback signal, the resistors 6 and 7 are each shunted by a filter condenser, as is customary.

In the operation of the apparatus so far described, each of the anodes of the triodes 9 and 10 swings in a positive direction during each half cycle in which the other anode swings in a negative direction. When the amplifier $E'$ impresses no signal on the control grids of the valves 9 and 10, those valves are similarly conductive and the net voltage between the point b and the ground connection D is zero. When the amplifier $E'$ is impressing an alternating current signal on the control grids of the valves 9 and 10, that signal will increase the conductivity of one triode or the other. Which triode has its conductivity increased depends on the phase of the amplifier signal. When the conductivity of the triode 9 is thus increased, the potential at the point b will become positive relative to the ground potential at the point d. Conversely, when the amplifier output signal increases the conductivity of the triode 10, the potential at the point b will be made negative relative to the potential at the point d.

The potential differences between the points b and d, produced by the signals impressed on the control grids of the triodes 9 and 10 by the amplifier $E'$, provide a measure of the value of the output current of the element A. That measure is utilized in accordance with the present invention to actuate the relatively rugged reversible electric motor M in selective accordance with changes in the output current of the ionization chamber A. As shown in Fig. 1, the motor M is thus actuated in response to variations in the potential difference between the points b and d to simultaneously adjust the recording pen arm $N'$, the indicator N, the regulating valve O, and a potentiometer H included in the motor control circuit for the motor M.

The novel mechanism G shown in Fig. 1 for controlling the operation of the motor M comprises a pair of electronic triode valves 12 and 13. The latter have their anodes connected to the opposite ends of the secondary winding 14 of a transformer $T_2$. The latter has its primary winding connected across the supply conductors $L'$ and $L^2$. The control grid of the valve 12 is connected by a conductor 16 to the slider contact of one of the slide wire resistors of the potentiometer H. A slider contact 17, engaging and adjustable along a second slide wire of the potentiometer H, is in engagement with an elongated contact conductor 18 which has one end connected to conductor 5. The potentiometer H is of the well known type comprising two slide wires connected in parallel with one another, each slide wire being connected in series with a source of unidirectional voltage. The control grid of the valve 13 is connected by a conductor 19 to the grounded point d. The cathodes of the valves 12 and 13 are connected through a biasing resistor 15 to the point c. The resistor 6 is thus connected in the input circuit of the triode 12 in series with the potentiometer H and with the biasing resistor 15, and the resistor 7 is connected in the input circuit of the triode 13 in series with the biasing resistor 15.

The control winding 20 of the motor M, and a condenser $C_3$ in shunt with that winding, are connected by a center tap conductor 14a to the midpoint of the secondary winding 14 of the transformer $T_2$. As shown, the second terminals of the winding 20 and condenser $C_3$ are connected to the point c through a conductor 21 and a portion of the center tap conductor 11a. The power winding 22 of the motor M is connected in series with a condenser $C_4$ across the supply conductors $L'$ and $L^2$. When the bias voltages impressed on the control grids of the valves 12 and 13 are equal, the two valves are equally conductive and are not capable of operatively energizing the motor control winding 20. On a change in the output current from the chamber A and a resultant change in the potential difference between the points b and d, the bias potential impressed on the valve 12 is correspondingly increased or decreased. Such bias potential change unbalances the motor drive section G, causing a flow of current through the winding 20 which starts the motor M into operation. The motor operation thus started continues until the potential impressed on the control grid of the valve 12 again becomes equal to the ground potential applied to the control grid of the valve 13.

As diagrammatically shown, the elements rotated by the motor M include a threaded spindle m, a worm ma, and a worm mb. The spindle m is threaded in engagement with a movable member connected to and moving the contact 17 and the pen arm N'. Thus, the rotation of the spindle m adjusts the contact 17 along the corresponding slide wire of the potentiometer H, and thereby varies the bias voltage which the potentiometer H supplies to the input circuit of the triode 12. The rotation of the worm ma operates through a pinion gear to oscillate the indicator N about the axis of said pinion gear so that the free end of the indicator N will travel along the arc defined by the curved scale n. As the pen arm N' is moved, it traces a record on the chart na which may be of the travelling strip type. The rotation of the worm mb rotates a gear mounted on the spindle o of the control valve O. As will be apparent, the position of the free end of the indicator N along the scale n indicates the instantaneous value of the output current of the ionization chamber A. The adjustments of the spindle o of the valve O adjust the flow capacity of the valve O in accordance with variations in the value of the output current of the chamber A, as may be desirable in some cases. The adjustment of the slider contact 17 along the slide wire of the potentiometer H is a motor control circuit follow-up adjustment which restores the normal equality of the potentials impressed on the control grids of the triodes 12 and 13 and arrests the operation of the motor M.

As will be apparent, variations may be made in the form of the circuit provisions through which the amplifier E' produces its operating results obtained in the practice of the present invention. For example, a single transformer may be employed to supply anode currents to the four valves 9, 10, 12, and 13. Thus, as shown in Fig. 2, the anodes of the valves 12 and 13 are connected to the end terminals of the secondary winding 14 of the transformer T₂ as in Fig. 1, while the anodes of the valves 9 and 10 are also connected through conductors 23 and 24 to the end terminals of the winding 14. As will be apparent, the operation of the apparatus shown in Fig. 2 is no different from what it would be if the anodes of the valves 9 and 10 were connected to the end terminals of the secondary winding 11 of the transformer T₁ as they are in Fig. 1.

The apparatus illustrated and described herein is simple and effective and has a substantial advantage in that the energizing circuit for the motor M is entirely disassociated from the sensitive circuit for amplifying the minute output signal of the ionization chamber A. In consequence, the motor M may be rugged in construction, and may utilize as much energy as its operation requires, without giving rise to noise effects in the sensitive circuit.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In apparatus of known type comprising first and second resistors each having one end directly connected to one end of the other and means connected to the second ends of said resistors for passing oppositely directed unidirectional currents of varying relative magnitudes through said resistors, the improvement comprising first and second electronic valves each having an anode, a cathode and a control grid, and each having its cathode connected to the connected ends of said resistors, a first conductive connection between the control grid of said first valve and the second end of said first resistor, a separate conductive connection between the control grid of said second valve and the second end of said second resistor, an adjustable source of unidirectional voltage included in one of said conductive connections, means for feeding anode currents in phase opposition to said valves, comprising other conductive connections from the anodes and cathodes of said valves to a source of alternating current, and means responsive to and actuated by a variation from a normal ratio of the values of the first mentioned currents for adjusting said adjustable voltage source to restore said normal ratio.

2. An improvement as specified in claim 1, in which said source of alternating current is the secondary winding of an alternating current transformer, and in which said other conductive connections connect said winding between said anodes and form a circuit portion connecting said cathodes to said winding at a point substantially mid-way between its ends.

3. An improvement as specified in claim 2, in which the means for adjusting said voltage is a reversible, two phase, alternating current motor having a control winding connected to and supplied with secondary current by said circuit portion and having a power winding, and including conductive connections to said power winding for connecting said winding to a source supplying alternating current to said power winding of the same frequency and of a phase displaced substantially 90° from the phase of the current supplied to said control winding.

4. In apparatus comprising a circuit network including first and second resistors, each having one end connected to one end of the other resistor, and means for impressing a variable unidirectional voltage across each resistor which opposes the voltage impressed across the other resistor, the combination for measuring the voltage across said resistors comprising first and second electronic valves each having an anode, a cathode, and a control grid, conductive connections between said cathodes and the connected ends of said resistors, a first conductive connection connecting the control grid of said first valve to the second end of said first resistor, a second conductive connection connecting the control grid of the second valve to the second end of said second resistor, the conductive connection to one of said control grids including a regulable source of unidirectional voltage, means for feeding anode currents of opposing phases to said valves, comprising connections conductively connecting said anodes and cathodes to a source of alternating current, a reversible alternating current motor, and energizing means for said motor responsive to a variation between the voltage across said resistors and the voltage of said regulable source of voltage for adjusting said regulable source of voltage to eliminate said variation.

5. In measuring and controlling apparatus of the known type, comprising means for converting a small unidirectional voltage signal into an alternating current signal, electronic amplifying means for amplifying the last mentioned signal, a phase sensitive rectifier for rectifying the amplified signal, said rectifier comprising a pair of electronic valves having anodes, cathodes, and control grids and having said control grids connected to said amplifying means, a separate cathode resistor connected to each cathode and connecting the latter to the other cathode resistor and through the latter to the cathode of the other valve, and means including conductive connections to a source of alternating current from said anodes to the connected ends of said cathode resistors for feeding anode currents of opposing phases through the anode circuits of said valves, the improved means for measuring the voltage across said series connected resistors, comprising third and fourth electronic valves each having an anode, a cathode, and control grid, conductive connections between the cathodes of the last mentioned valves and the connected ends of said resistors, a first conductive connection connecting the control grid of said third valve to the second end of said first resistor, a second conductive connection connecting the control grid of said fourth valve to the second end of said second resistor, the conductive connection to one of the two last mentioned control grids including a regulable source of unidirectional voltage, means for feeding anode currents of opposing phases to said third and fourth valves, comprising connections conductively connecting the anodes and cathodes of said third and fourth valves to a source of alternating current, a reversible, alternating current motor, and energizing means for said motor responsive to a variation between the voltage across said resistors and the voltage of said regulable source of voltage for adjusting said regulable source of voltage to eliminate said difference.

References Cited in the file of this patent

UNITED STATES PATENTS

| Number | Name | Date |
|---|---|---|
| 2,355,537 | Jones | Aug. 8, 1944 |
| 2,396,187 | Means et al. | Mar. 5, 1946 |
| 2,449,476 | Harrison | Sept. 14, 1948 |
| 2,522,976 | Williams | Sept. 19, 1950 |
| 2,527,718 | Grass | Oct. 31, 1950 |